(12) United States Patent
Haupt et al.

(10) Patent No.: US 8,897,841 B2
(45) Date of Patent: Nov. 25, 2014

(54) WIRELESS HEADPHONES AND DATA TRANSMISSION METHOD

(75) Inventors: Axel Haupt, Langenhagen (DE); André Michaelis, Wedemark (DE); Rolf Meyer, Wennigsen (DE); Katrin Huss, Singapore (SG); Jens Wildhagen, Burgdorf (DE)

(73) Assignee: Sennheiser electronic GmbH & Co. KG, Wedemark (DE)

( * ) Notice: Subject to any disclaimer, the term of this patent is extended or adjusted under 35 U.S.C. 154(b) by 1641 days.

(21) Appl. No.: 11/665,689

(22) PCT Filed: Oct. 19, 2005

(86) PCT No.: PCT/EP2005/011228
§ 371 (c)(1),
(2), (4) Date: Oct. 11, 2007

(87) PCT Pub. No.: WO2006/042749
PCT Pub. Date: Apr. 27, 2006

(65) Prior Publication Data
US 2008/0194209 A1    Aug. 14, 2008

(30) Foreign Application Priority Data
Oct. 19, 2004   (DE) .......................... 10 2004 051 091

(51) Int. Cl.
*H04M 1/00*    (2006.01)
*H04L 29/12*   (2006.01)
*H04H 20/63*   (2008.01)
*H04H 40/27*   (2008.01)

(52) U.S. Cl.
CPC ......... *H04L 29/12009* (2013.01); *H04H 20/63* (2013.01); *H04H 40/27* (2013.01); *H04L 61/00* (2013.01)
USPC ....................................................... 455/569.1

(58) Field of Classification Search
USPC ............................ 455/73, 569.1; 381/58, 119
See application file for complete search history.

(56) References Cited

U.S. PATENT DOCUMENTS

| | | | |
|---|---|---|---|
| 6,212,282 B1 | 4/2001 | Mershon | |
| 7,216,178 B2 * | 5/2007 | Juszkiewicz | 709/231 |
| 7,693,289 B2 * | 4/2010 | Stathem et al. | 381/58 |
| 2002/0111140 A1 | 8/2002 | Kim | |
| 2002/0196955 A1 | 12/2002 | Boesen et al. | |
| 2003/0217179 A1 | 11/2003 | Famolari et al. | |
| 2004/0068570 A1 | 4/2004 | Haller | |
| 2007/0180137 A1 * | 8/2007 | Rajapakse | 709/231 |
| 2008/0175413 A1 * | 7/2008 | Okabayashi | 381/119 |

FOREIGN PATENT DOCUMENTS

| | | |
|---|---|---|
| DE | 101 14 670 | 10/2002 |
| DE | 102 01 323 | 7/2003 |
| DE | 20 2004 005 111 | 8/2004 |

(Continued)

*Primary Examiner* — Ankur Jain
(74) *Attorney, Agent, or Firm* — Frommer Lawrence & Haug LLP (57) ABSTRACT

There is provided a wireless headphone unit having at least one electroacoustic transducer and a transmitting/receiving unit for wirelessly receiving first signals which contain audio signals to be reproduced on the electroacoustic transducer and a network identification unit for storing the network identification of the wireless headphone unit, wherein the transmitting/receiving unit is adapted for wirelessly transmitting the network identification of the headphone unit.

3 Claims, 7 Drawing Sheets

(56) References Cited

FOREIGN PATENT DOCUMENTS

| DE | 20 2004 010 879 | 10/2004 |
| EP | 1 309 222 | 5/2003 |
| EP | 1 406 224 | 4/2004 |
| EP | 1 455 487 | 9/2004 |
| WO | 03/093950 | 11/2003 |

* cited by examiner

WIRELESS HEADPHONES AND DATA TRANSMISSION METHOD

CROSS-REFERENCE TO RELATED APPLICATIONS

This application claims priority of International Application No. PCT/EP2005/011228, filed Oct. 19, 2005 and German Application No. 10 2004 051 091.1, filed Oct. 19, 2004, the complete disclosures of which are hereby incorporated by reference.

BACKGROUND OF THE INVENTION a) Field of the Invention

The present invention concerns a wireless headphone unit, a wireless microphone, a wireless headset and a data transmission method.

b) Description of the Related Art

The spread of digitally compressed music for example in the form of MP3 files has risen greatly in recent years. Audio files are digitized and stored for example on a hard drive of a computer or the like. Thus, computers are increasingly used as music servers in the private sector and the computer is used for playing back the audio files stored thereon. Thus, it is possible to listen to music on a wired system and, if the computer has for example a radio interface, it is also possible to listen to music wirelessly or it is possible to provide for wireless transmission of the audio files or the audio signals. There are also music servers which are connected to the Internet and which provide audio files free or for a fee. A user can download the free or paid-for audio files on to his own computer by way of the Internet and can then listen to the downloaded audio files. By means of a mobile telephone or a mobile radio-enabled PDA, a user, on the basis of HSCSD, GPRS, UMTS or the like, can access the Internet and thus also download audio files of that kind. In that respect however it is found that there is the disadvantage that a large amount of data has to be transmitted at often an only low data transmission rate.

A PDA or a notebook with a WLAN interface (IEEE 802.11) can also wirelessly access the Internet if the PDA or the network is within the transmission range of a WLAN access point. That is particularly advantageous in terms of the data transmission rate, in comparison with a mobile radio connection.

DE 20 2004 005 111 U1 discloses a wireless Bluetooth headphone unit which has an electroacoustic transducer and a transmitting/receiving unit for the wireless reception of signals which include audio signals to be reproduced.

DE 101 14 670 A1 discloses a mobile multimedia device having a first transmitting/receiving unit for communication with a mobile radio network and a second transmitting/receiving unit for receiving radio broadcast frequencies. Stored in a transmitter is a reception authorisation which was received by way of the first transmitting/receiving device. The multimedia device also has a decoding means for decoding the multimedia content received in encoded form by way of the second transmitting/receiving unit. An authorisation request for multimedia contents is communicated wirelessly by way of the first transmitting device.

The above-described downloading of data, in particular audio files, from the Internet is however not always acceptable in terms of copyright.

OBJECT AND SUMMARY OF THE INVENTION

Therefore the primary object of the present invention is to provide mobile access to data stored in an Internet server, which appears acceptable in terms of copyright. A further object of the present invention is to provide a wireless headphone unit, a wireless microphone and a wireless headset which permit improved linking into existing or present communication environments.

The invention concerns the idea of providing a for example WLAN-based headphone unit or a WLAN-based receiving device with headphone unit connection, to which for example audio files can be wirelessly transmitted, insofar as they are in a transmission range for example of a WLAN access point. In that case a connection is made between the headphone unit or the receiving device with a server and/or server service which supports the client functionalities. In that case the server and/or server service can be its own server/server service or an outside server/server service whose connecting data are known and to which the user has access rights. More precisely a connection is made between the access point and the server or server service on which the data to be downloaded are to be found, which can be wired but also partially or entirely wireless. The data are then transmitted wirelessly based on the WLAN interface (for example IEEE 802.11) from the access point to the headphone unit or the receiving device. Thus it is possible for one's own digitally stored music to be received wirelessly in the transmission range of a WLAN access point. The fact that it is possible to have access to one's own music means that proof of rights is possible throughout, so that this appears to be acceptable in terms of copyright. Access on the part of the WLAN headphone unit or the WLAN receiving device to one's own data is effected in that respect in the same fashion irrespective of whether the headphone unit or the receiving device are in a transmission range of one's own private WLAN access point or in the transmission range of a public WLAN access point.

For the permitted access to one's own audio data, it is not absolutely necessary to physically possess a data carrier with those audio data. Audio data to which access can be had in the permitted fashion in accordance with this invention can be one's own music data carriers or audio data which can be downloaded from a web-based service, possibly for payment of a fee, or audio data which, possibly for payment of a fee, can be copied across to a server/server service to be defined, from which they can then be called up as desired. In particular the non-physical purchase of audio data is worthy of mention in connection with this invention.

Possibly the necessary storage space in the private sphere is not adequate to store all audio data. It is also possible to conceive of a web-based service or a provider which takes over the storage operation and which can be accessed in the usual manner. That service could also be fee-paying or could be incorporated into other service agreements.

In this respect the invention further concerns the idea of designing a headphone unit not just as a passive audio receiver but rather as an active network element or as a web client which affords an Internet service so that other network elements can also have access thereto. A corresponding consideration applies to a microphone and to the headset.

Thus there is provided a wireless headphone unit having at least one electroacoustic transducer and a transmitting/receiving unit for wirelessly receiving first signals which contain the audio signals to be reproduced on the electroacoustic transducer and a network identification unit for storing a network identification of the wireless headphone unit, wherein the transmitting/receiving unit is adapted for wirelessly transmitting the network identification of the headphone unit, wherein the network identification of the wireless headphone unit which is stored in the network identification unit represents an Internet protocol address.

Accordingly the wireless headphone unit does not just represent an only passive receiver of audio signals but is now an active network element. This therefore ensures that the wireless headphone unit can be uniquely identified in a network. On the basis of the IP address it is possible to access the wireless headphone unit by way of the Internet, that is to say the wireless headphone unit is world-wide addressable.

In accordance with a further aspect of the present invention the IP address is allocated by a network element in a wireless network in which the wireless headphone unit is disposed.

In accordance with a further aspect of the invention the headphone unit has a buffer for the intermediate storage of the received signals. By virtue of a buffer of that kind it is possible to bridge short-term interruptions in the reception of the first signals without reproduction of the audio signals by way of the electroacoustic transducer having to be stopped thereby. The buffer memory can be a component part of the transmission protocol (streaming protocol) or it can be implemented in the application software as a supplement to the transmission protocol.

In accordance with a further aspect of the present invention the wireless headphone unit has a display unit for displaying second signals which were received by the transmitting/receiving unit together with the first signals. Accordingly additional information to the audio signals such as for example a title and an artist of a piece of music can be displayed on the display unit.

In accordance with a further aspect of the present invention the wireless headphone unit has selection keys or buttons. By means of the selection keys the user can influence the display on the display unit and communicate with further network elements in the network. In that way the user can select for example audio files stored on a server in the network so that they can be transmitted to the wireless headphone unit for reproduction thereof.

The invention also concerns a wireless microphone comprising an electroacoustic transducer for recording audio signals and a transmitting/receiving unit for wirelessly transmitting the recorded audio signals. The wireless microphone also has a network identification unit for storing a network identification of the wireless microphone. The transmitting/receiving unit further serves to transmit the network identification of the microphone, which is stored in the network identification unit. There is thus provided a wireless microphone which no longer merely represents just a passive transmitter of audio signals but is now implemented in the form of an active network element and thus provides an Internet service.

The invention further concerns a wireless headset which has at least a first electroacoustic transducer for reproducing audio signals and a second electroacoustic transducer for recording audio signals. The headset further has a transmitting/receiving unit for wirelessly transmitting and receiving as well as a network identification unit for storing a network identification of the headset. The network identification of the headset is wirelessly transmitted by means of the transmitting/receiving unit.

BRIEF DESCRIPTION OF THE DRAWINGS

The invention is described in greater detail hereinafter with reference to the drawings in which.

DESCRIPTION OF THE PREFERRED EMBODIMENTS

Figure 1:
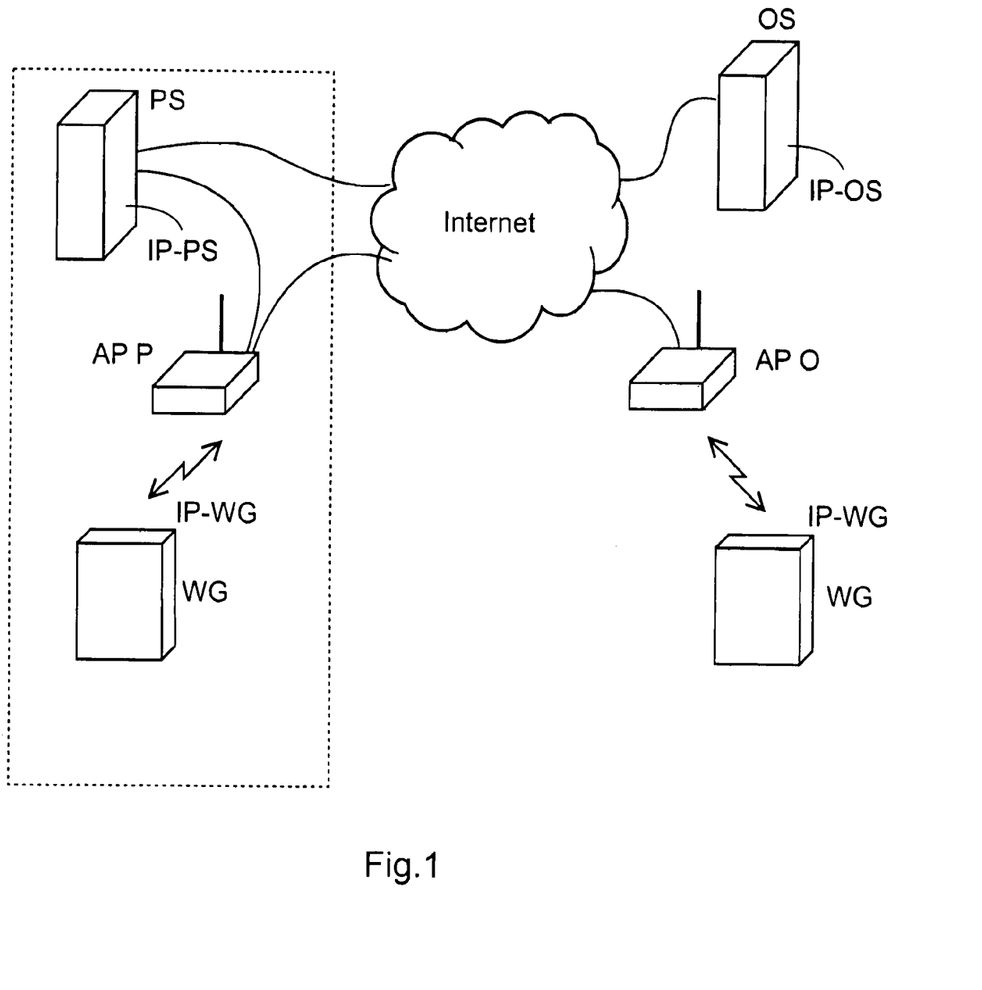
FIG. 1 shows a structure in principle of a transmission system according to the invention.

FIG. 1 shows a structure in principle of a transmission system according to the invention. Essentially what is shown here are a private region and a public region which are connected together by way of the Internet. Shown in the private region is a private server PS which for example has a wired connection to an access point APP. That access point is based on a WLAN interface and communicates wirelessly with a reproduction device WG in the transmission range of the access point APP. Arranged in the public region is a public server OS which for example has a wired connection to the Internet. Also shown is a further access point APO which also has a wired connection to the Internet. That access point APO is also based on a WLAN interface and communicates wirelessly with a reproduction device WG which is in its transmission range.

For communication with the private access point APP or with the public access point APO a reproduction device WG has a WLAN interface. In addition thereto associated with the reproduction device is its own IP address. Communication of a reproduction device WG in a transmission range of the private access point AP is effected wirelessly to the private access point APP and then by a wired connection between the private access point APP and the private server. Alternatively or in addition thereto the private access point APP can have for example a wired connection to the Internet. In that way a communication would be possible between the reproduction device WG in the transmission range of the private access point APP and a public server OS by virtue of the fact that the private access point APP is connected to the public server OS by way of the Internet.

As an alternative thereto the reproduction device WG can also have a wired communication with the access point.

Communication between the reproduction device WG in the transmission range of the public access point APO and a public or private server OS, PS is effected wirelessly as far as the public access point APO and then by way of the Internet to the public server OS or the private server PS.

Thus, irrespective of whether the reproduction device WG is in a private or a public region, it can access both the private server PS and also the public server OS as long as it is in a transmission range of an access point.

Figure 2:
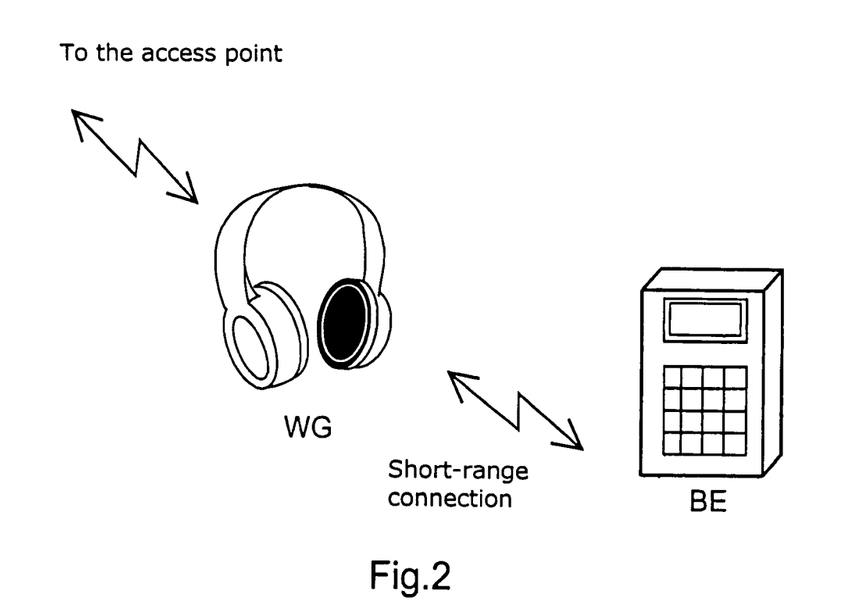
FIG. 2 shows a reproduction device in accordance with a first Embodiment.

A communication between the reproduction device WG and the public server OS or the private server PS is effected in particular by way of the Internet protocol. For that purpose the reproduction device has a suitable IP address IP-WG and the private and public servers also have corresponding IP addresses IP-PS, IP-OS. Mutual communication is thus effected on the basis of the respective IP addresses. That has in particular the advantage that the public or private server OS, PS can establish whether the receiver of the data is also actually the reproduction device WG. If the IP address of the data receiver is not in conformity with the IP address IP-WG of the reproduction device WG, communication of the respective data can be prevented. On the basis of the IP address it is also possible to trace back to whom the respective data were communicated. FIG. 2 shows a diagrammatic representation of a reproduction device of FIG. 1 in accordance with a first embodiment. In accordance with the first embodiment the reproduction device is in the form of a headphone unit with a WLAN interface. In other words, the headphone unit communicates directly on the basis of WLAN with an access point. Thus no further device is required for receiving the wirelessly transmitted signals. All necessary elements are integrated in the wireless headphone unit. This means that data can be wirelessly received by means of the wireless WLAN headphone unit if the headphone unit is in a transmission range of a WLAN access point.

As an alternative to a WLAN interface the reproduction device can also have an interface which permits a wired communication with the access point. As an alternative to the WLAN interface the reproduction device can also have a wireless interface which is based on another wireless communication protocol.

An external operating element BE can be provided for improving the operability of the wireless headphone unit. The communication between the operating element BE and the headphone unit can be either wired or wireless (IR, Bluetooth, HF). In that case the operating element only serves for operation of the wireless headphone unit. No WLAN interface is integrated in the operating element BE. As an alternative thereto the operating element can also be integrated on the headphone unit.

Figure 3:
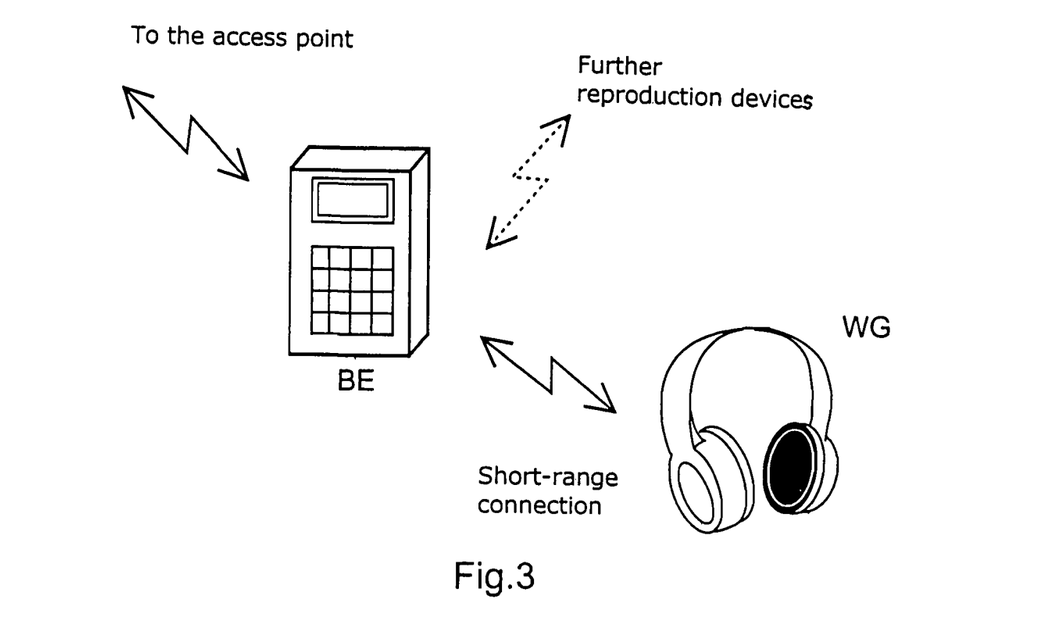
FIG. 3 shows a reproduction device in accordance with a second embodiment.

FIG. 3 shows a diagrammatic view of a reproduction device in accordance with a second embodiment. This Figure also shows a headphone unit and an operating element BE. In contrast to the first embodiment however a WLAN interface is integrated in the operating unit BE so that the operating unit communicates wirelessly with an access point. The received data are transmitted from the operating unit BE to the headphone unit by a wired connection or wirelessly (IR, Bluetooth, HF etc). In accordance with the second embodiment therefore the WLAN interface is integrated in the operating unit BE while the headphone unit only represents a conventional headphone unit.

Integration of the WLAN interface in the operating unit BE proves to be advantageous in terms of the battery voltage required as there is a larger amount of space available in an operating element of that kind.

An operating element in accordance with the second embodiment of the invention can in that respect represent any device having a WLAN interface such as for example a notebook, a PDA, a mobile telephone, a Voice-over-IP telephone or the like. The operating element can also be implemented in the form of an MP3 player with a WLAN interface. If an operating element of that kind has a sufficiently large intermediate memory or buffer a plurality of audio files can be previously loaded on to the operating element so that subsequently they can be played back independently of a connection to an access point.

The operating element in accordance with the second embodiment can thus also service further headphone units with a corresponding audio signal—either by a wired connection or wirelessly.

By means of the above-described wireless headphone unit with an integrated WLAN interface a person wearing such a headphone unit can listen to music whenever he is in the transmission range of a WLAN access point. High-quality audio reproduction is made possible by virtue of the high transmission rate in the case of WLAN. Furthermore, downloading of the corresponding data of the audio files or pieces of music to be reproduced can be substantially effected in real time so that only a very small intermediate memory or buffer is required in the headphone unit. Alternatively or in addition thereto the corresponding data can also be loaded at a higher speed and correspondingly stored in the intermediate memory or buffer. Thus the headphone unit can also be supplied with music and correspondingly reproduce same when the headphone unit is not in a transmission range of a WLAN access point. Essentially the wireless headphone unit has all necessary hardware elements which are required both for downloading and also for reproducing audio files which are correspondingly downloaded from the Internet.

To reduce the data to be transmitted the audio files can be stored and transmitted in a compressed form such as for example MP3, MP3pro, WMA, Ogg Vorbis or the like. That accordingly involves decompression only in the receiver, that is to say in the wireless headphone unit. Thus the wireless headphone unit must have a unit for decompression of the compressed audio signals or suitable software for that purpose. As an alternative thereto the required software can also be transmitted together with or prior to the audio data. That is particularly advantageous insofar as there can be various versions of such a headphone unit from various manufacturers and the respective headphone unit always receives the newest software version available thereto.

Both in accordance with the first and also the second embodiment a reproduction device, that is to say an operating element or a wireless headphone, can both receive and also transmit data. Thus such a reproduction device can receive data wirelessly from an access point and then forward it again to further reproduction devices. That can take place either by a wired connection or wirelessly based on infrared, Bluetooth, HF or the like. Thus not just audio files but also audio streams can be simultaneously received by the reproduction device and correspondingly forwarded. In addition the reproduction device, that is to say the wireless headphone unit or the operating element, can provide for time control of reproduction to external reproduction devices in such a way that reproduction takes place synchronously. As an alternative thereto reproduction can be suitably delayed in the wireless headphone unit which is connected to the access point in order to achieve synchronous reproduction on all reproduction devices. Essentially therefore the wireless headphone unit or the operating element is in the form of a master, the further reproduction devices being implemented as the slave. Thus a wireless headphone unit or an operating element will occur as a local server and make the stored audio files available to other reproduction devices. Transmission of the data stored in the wireless headphone unit or the operating element can be effected either in real time or at an increased speed so that the other reproduction devices permit later or time-displaced reproduction in accordance with the size of their intermediate memory or buffer.

In a preferred embodiment of the invention the wireless headphone unit is designed in such a way that when it is switched on it dials in at a WLAN access point if it is in a transmission range of a WLAN access point. Thereafter the wireless headphone unit makes a connection to a given server on which the audio files to be transmitted are to be found. That can be effected for example based on the Internet protocol, on the basis of a specific IP address of such a server. That server can either represent a private server which is for example permanently connected to the Internet by way of a DSL connection. As an alternative thereto the data which are to be downloaded can also be on a further server which is permanently connected to the Internet.

The wireless headphone unit in accordance with the first and second embodiments checks at regular intervals whether it is in a transmission range of an access point. As soon as it discovers that it is in a transmission range of an access point and has made a connection to that access point that is indicated to the user either optically by an LED display, acoustically by a signal tone in the headphone unit or mechanically by a vibration alarm. If a suitable operating element is present that message can also be produced at the operating element. Such a message however can also be switched off.

The user can also adjust whether he would or would not like to make contact with a server.

Actuating selection keys on the wireless headphone unit or on the operating element initiates a connection with a server on which the data to be transmitted are to be found. That therefore initiates a connection without further destination information having to be inputted as such information is already previously stored in the headphone unit. If, in the case of ongoing communication of data, the connection to the WLAN access point is interrupted, the headphone unit tries at intervals which are to be defined to restore a connection and to resume transmission of the corresponding data until all data have been transmitted.

In order to improve proof of rights throughout and in order to prevent unwanted eavesdropping or misuse of the transmission of data between a wireless WLAN headphone unit and a specific server or headphone unit, transmission of the data is effected in encrypted form. A corresponding key can vary during the transmission at intervals of time which are defined beforehand or from one download to another. Existing web functionalities, for example SSL, can also be used for encryption.

In accordance with a further embodiment an operating element described in accordance with the second embodiment of the invention is arranged in an automobile or the like. In this case however it should be noted that the intermediate memory or the buffer is of a sufficient size as there is not always any guarantee that the operating element is in a transmission range of a WLAN access point. Therefore preferably before starting a journey or at fixed stations such as for example a service area or a gasoline station data should be loaded at a high rate. Alternatively thereto or in addition thereto for example further access points can be provided at the outskirts of a city, at which specific items of information regarding the surrounding area such as for example tourist attractions, traffic information, navigation information or the like are stored. Those items of information which are to be reproduced can represent items of audio and video information, in which case reproduction is also made possible by way of installed loudspeakers or installed video picture screens in the automobile. Reproduction of the information can also be triggered by a navigation system or another item of position information (for example mobile radio or GPS).

That is also possible if a user is in an aircraft or a train. In that case the WLAN access point is arranged in the train or in the aircraft so that the user is always in a suitable transmission range of a WLAN access point.

As the data stored on a private server PS or a public server OS can involve a very large amount of data, it is necessary to ensure that a user can navigate within those data. For that purpose for example a program is implemented on the server, which sorts and suitably predefines the data on the server. As soon as the wireless headphone unit then forms a connection with that server the corresponding audio files are communicated to the wireless headphone unit so that it can play the files back. Navigation can be effected either by way of selection keys or buttons on the headphone unit or by way of speech input by means of an additional microphone. In other words, by means of the selection keys and the speech commands, a user can control a corresponding navigation program on the server. Alternatively the navigation program can be a component part of the headphone unit, in which case then the commands are so translated that the server service understands them and executes the corresponding commands. An operating element with a display can either be integrated in the headphone unit or can be in the form of an external device. Thus, by means of the selection keys and the display of the operating element, the user can navigate in and suitably select the structured data files or data banks on the private or public server.

When a connection is made between the wireless headphone unit and the specific server on which the corresponding data are stored items of information regarding the structure of the data and the audio data bank can be communicated beforehand. As soon as those data are stored in the intermediate memory or buffer offline navigation can also be effected when the wireless headphone unit is not in a transmission range of a WLAN access point.

Alternatively or in addition to the foregoing the server on which the data are stored can be adapted to produce a synthetic announcement in respect of the data to be communicated. That synthesized announcement can be stored in the memory of the reproduction device. In that case the announcement can be produced in the form of an MP3 file, a wafe file or the like and correspondingly stored in the reproduction device so that that file can be correspondingly reproduced during reproduction or at the beginning of reproduction of the data. That is found to be advantageous in particular for reproduction devices without a display as the title name per audio output can be outputted to the user. As already mentioned hereinbefore the title announcement is preferably produced by speech synthesis from the data file name or the ID tag in the case of MP3 files. That speech synthesis is preferably effected in the server or such speech synthesis can already be implemented beforehand and the resulting synthesized announcement can also be stored on the server so that the data can be communicated together with the announcement to the reproduction device. The fact that speech synthesis takes place not in the reproduction device but on the server or on an upstream device means that the complexity of the reproduction device does not have to be increased in order to ensure that the synthesized announcement can be suitably played.

Preferably the title of a data file, the duration of the file and secondary items of information such as for example the music genre, the artist or the like can be provided as the synthesized announcement.

As an alternative to the foregoing speech synthesis can be effected when the corresponding data files are requested for transmission. That is found to be advantageous insofar as it is possible to save on storage space on the server as the synthesized announcement only has to be produced for data files which are actually to be downloaded.

The above-described speech synthesis can also be used to navigate in the menu control of indexes on the server. For that purpose the menu structure is suitably subjected to speech synthesis so that the menu structure of the indexes can be acoustically reproduced in the reproduction device.

Alternatively or in addition to the foregoing the acoustic announcements in respect of the data files can be produced beforehand and stored together with the data or data files. As an alternative thereto the announcements can be produced in result-related fashion.

As already mentioned hereinbefore the operating element can have either a wired or a wireless connection to the wireless headphone unit. After the audio files which are to be correspondingly downloaded have been selected the operating element does not have to be further used as all corresponding data are stored in the wireless headphone unit or have been communicated to the corresponding server.

Besides navigation within the data or data banks on the specific server, navigation within the audio files is also desirable. For that purpose selection keys or buttons can also be provided on the wireless headphone unit or on the operating element. Preferably those selection keys are characterized by tactile identification features so that a headphone unit does not have to be removed if navigation is to be effected within a piece of music. Examples of selection keys of that kind are start, stop, previous/next piece of music, previous/next song etc. The selection keys can also have multiple functions so it is possible to navigate both within a piece of music and also within the data files or data banks on the server.

The orders or commands which are inputted by the user by means of the operating element or the selection keys are communicated to the specific server by means of the return section of the WLAN interface. In that case the commands can be communicated in the form of machine commands or in the form of ASCII characters. The commands to the server/server service are effected in agreed, preferably standardized form, they can be for example byte sequences or also tone sequences.

Alternatively or in addition thereto, when a connection is made between a wireless WLAN headphone unit and a corresponding server with specific IP address, besides a transmission of the corresponding software, the possible commands can also be transmitted.

As, for a communication between the wireless headphone unit and a server, the IP address of the wireless headphone unit and the server must be known, it is immaterial whether the wireless headphone unit communicates with a public or a private server. In order to achieve the greatest possible attainability of data the data are stored on a server which has a permanent access to the Internet. That therefore only involves transmission or communication of data from one's own virtual storage space on to the wireless headphone unit. Thus the copyright in respect of the data on the servers is not infringed if the user has the corresponding rights.

Providers can set up a service in the form of a physically present 'kiosk', to the region of which a user goes in order to download music or information. Those data can be present directly there in the local server or can be loaded from more remote servers, for example on the Internet. They can also be one's own data which have been transferred deliberately there before starting a journey. Furthermore that 'kiosk' can exist in the form of a web service as a virtual 'kiosk' in the form of suitable software locally on a server or on the Internet, in which case the functionalities of a kiosk are suitably reproduced. Navigation is effected as already described hereinbefore by means of an operating device, operating keys and a display on the headphone unit or speech navigation.

For the purposes of financing public access points the operators of such access points can insert advertising between the transmitted signals. As an alternative thereto or in addition thereto items of operating information such as for example at an airport the flight times, the various flight calls, delays or the like can also be included.

Although reference is essentially made to audio files in the embodiments described hereinbefore the invention is not limited to just audio files. Videos, video clips, Internet radio, Voice-over-IP or the like can also be implemented in accordance with the invention.

Furthermore the system as described hereinbefore can also be used in relation to conferences in which a participant has a corresponding wireless headphone unit. On the basis of the IP address of the wireless headphone unit the corresponding audio signals can already be passed to the user in the correct language. If for example a headset is used the speech of the user can also be communicated to the conference system by means of the microphone of the headset in order to transmit contributions to the discussion. The unique IP addresses also make it possible to communicate specific messages to the respective persons.

Figure 4:
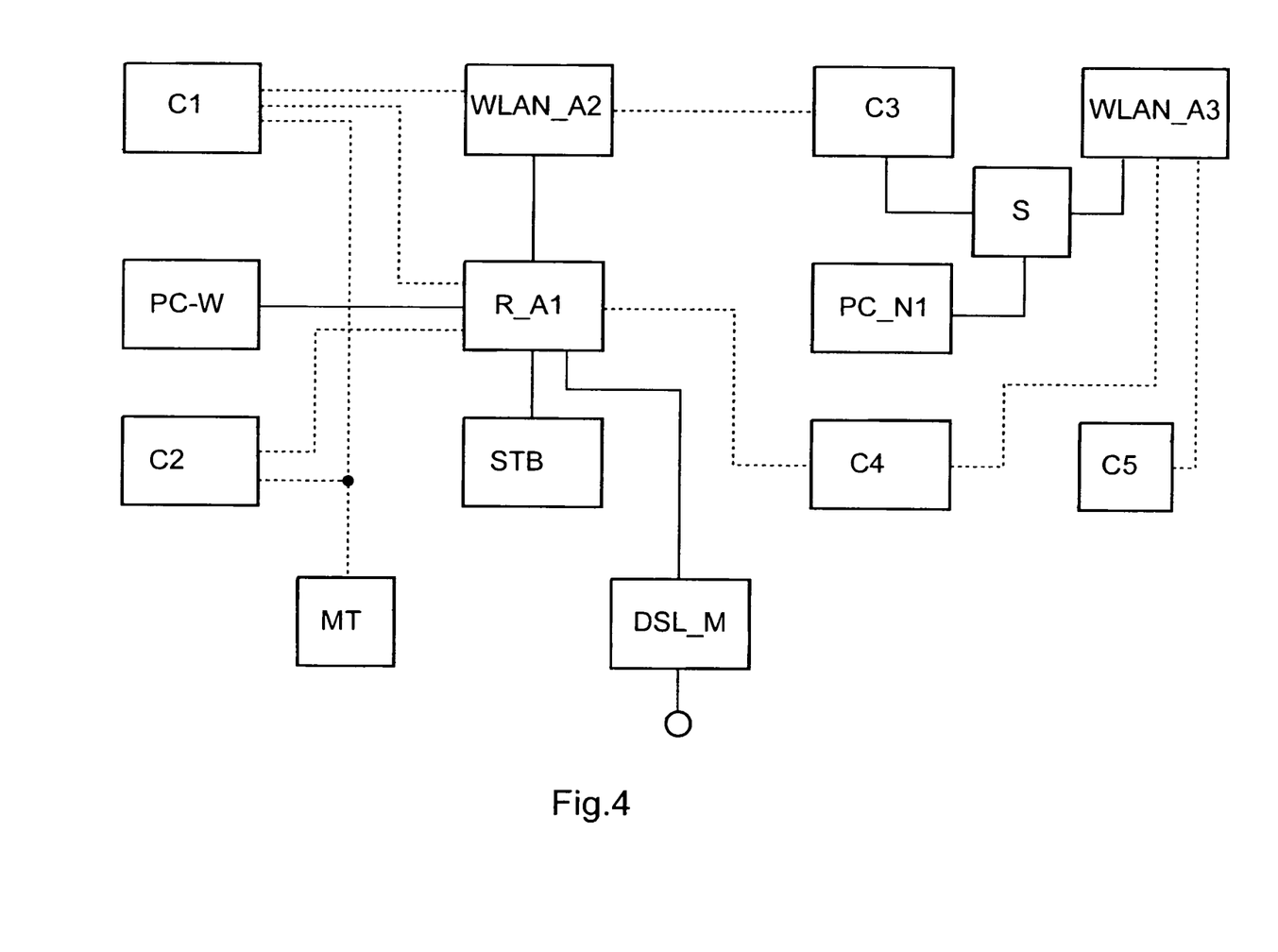
FIG. 4 shows a block circuit diagram of a multimedia network.

FIG. 4 shows a block circuit diagram of a multimedia network. This network is essentially based on a local area network LAN and a wireless local area network WLAN. The LAN is represented by the solid lines while the WLAN is represented by the broken lines. The network is connected to the Internet by way of a DSL modem DSL_M. In this arrangement a router R_A1 is connected to the DSL modem and serves as a central access point for the LAN network and for the WLAN network. In this case a first client C1 is for example implemented in the form of a PDA, a pocket PC or the like and plays audio and video data wirelessly from the available network. A headphone unit for example for reproduction of the audio signals can be connected to the first client C1. In addition the first client C1 can play live Internet radio or a user can operate therewith Internet telephony (Voice-over-IP).

A computer PC_W can be arranged for example in a living room and serve to store audio and video data. That computer can also serve as a data server for storage of data in the network. The computer can access the Internet by way of the router R_A1 and the DSL modem DSL_M and can download audio and video data from the Internet and suitably store same. As an alternative thereto not just data but also digital photographs can be stored. That computer PC_W is connected for example by way of a LAN connection to the central router R_A1.

A second client C2 is arranged for example in a workroom and connected to the central router R_A1 by way of a WLAN connection. By way of example a printer or the like can be connected to that computer.

A set top box STB can be connected to the router R_A1 by means of the LAN. That set top box STB in that case represents for example a digital receiver and receives audio and video signals by way of a satellite and makes those data or signals available to the other network elements. The signals received by the set top box STB can be transmitted by way of example by means of the LAN to the computer PC_W and stored there.

In this arrangement a WLAN access point WLAN_A2 serves as a second access point besides the router with the first access point R_µl and enlarges the reception range of the WLAN network for example to a piece of land or to a neighbouring dwelling. A third client C3 is arranged for example in a neighbouring dwelling and is in the reception range of the WLAN_A2, that is to say in the reception range of the second access point. The third client is connected by way of a switch S both to a computer of the neighbour PC_N1 and also to a third WLAN access point WLAN_A3. That third access point serves to enlarge the WLAN to a further piece of land or dwelling.

In this case the computer in the neighbouring dwelling PC_N1 substantially corresponds to the computer PC_W. A fourth client C4 which for example represents a notebook in the neighbouring dwelling is connected by way of a wireless connection both to the router with the first access point R_A1 and also to the third access point WLAN_A3. A fifth client C5 of a further neighbour is in this case coupled to the third access point by way of a WLAN connection.

In this respect a wireless local area network WLAN denotes a wireless local radio network which is generally based on the standard of the IEEE 802.11 family. WLAN networks usually operate in an infrastructure mode in which one or more base stations, that is to say wireless access points, control a communication between the clients in the network. In that arrangement the transport of data is generally effected by way of the various access points. As an alternative thereto, an ad hoc network is also possible, in which the clients communicate directly with each other. An ad hoc network of that kind represents a wireless network architecture which is built up between two or more mobile terminals without a fixed infrastructure.

An Internet protocol IP address is associated with each client C1-C5 and each PC PC_W, PC_N1, by the router R_A1. An IP address permits logical addressing of computers or network elements in IP networks such as for example the Internet. Those IP addresses are entered in each IP packet in the source and target address fields, that is to say each IP packet contains items of information about the address of the transmitter and the receiver. Version 4 of the Internet protocol IPv4 allows for example the use of IP addresses of 32 bits which are separated from each other by four dots. Each 32-bit IP address is separated into a network portion and a device portion (host portion). In the simplest case the first 16 bits reproduce the network portion and the last 16 bits reproduce the device portion. The sixth version of the IP protocol is now based on the use of 128-bit addresses. The IP addresses can either be permanently allocated to a network element or they can be dynamically attributed upon suitable dial-in. Within private networks, the IP address can itself be attributed. A connection of all computers with suitably allocated IP addresses in a private network to a computer on the Internet is implemented by way of a network address translation NAT.

IP addresses can be allocated when logging on network elements in a network by way of a suitable network server by means of protocols such as BOTP or DHCP. In that case, a range of IP addresses can be defined on the network server, from which further network elements can receive allocated thereto a suitable IP address. Such an address however does not represent a fixed IP address but it only applies for the period of time during which the network element is on the network. If the network element requires a fixed IP address the network elements can ascertain a MAC address (media access control) for example by way of the ARP protocol and thereupon obtain a permanent IP address.

A client as referred to hereinbefore represents an application which claims a service of a server in a network. A client can thus represent a computer or a network element in a corresponding network.

Figure 5:
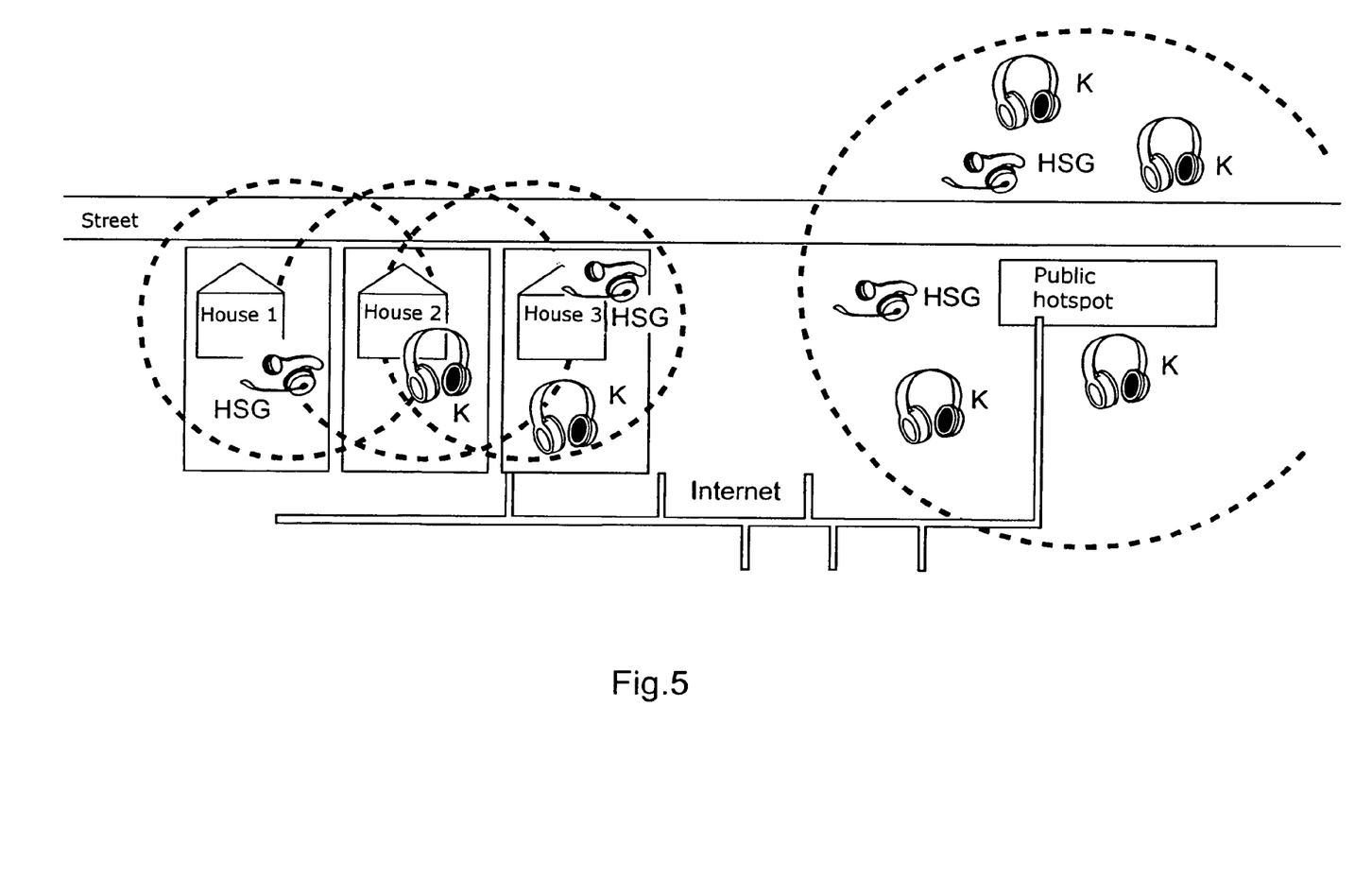
FIG. 5 shows a multimedia network in accordance with a third embodiment of the invention.

FIG. 5 shows a multimedia network in accordance with a first embodiment of the invention. The multimedia network shown in FIG. 5 can be implemented for example in the multimedia network shown in FIG. 4. In this case, in a transmission range of the access points (R_A1, WLAN_A2, WLAN_A3 in FIG. 4), network elements with a suitable WLAN interface can communicate with the network. For that purpose, an IP address is dynamically allocated to the corresponding network elements for example by the central router R_A1 or by a central service. As an alternative thereto each network element can also have a permanent IP address. The dotted circles represent the respective transmission ranges of the various access points. Thus for example the left-hand side of FIG. 5 shows three houses, house 1 through house 3, which each have a respective access point. That access point is connected by way of the Internet for example to what is referred to as a public hotspot, that is to say a public access point. The headphone units K and the headsets HSG shown in FIG. 5 have a WLAN interface and an IP address has been associated with them. In particular the headphone units K have a WLAN interface which is integrated into their housing. The same applies to the headsets HSG. Accordingly audio data can be transmitted wirelessly in the WLAN network directly to the network elements in the form of headphone units. Thus all functions in the reception range both of the private and also the public WLAN networks can be used wirelessly without an additional accessory by the headphone unit or the headset respectively. Thus for example audio files of one's own network-capable PC or from a music server can be wirelessly transmitted to the wireless headphone and played back. As an alternative thereto the headphone unit or the headset can be used for listening live to Internet radio. The headsets HSG can also be used for Internet telephony, that is to say for Voice-over-IP.

Figure 6:
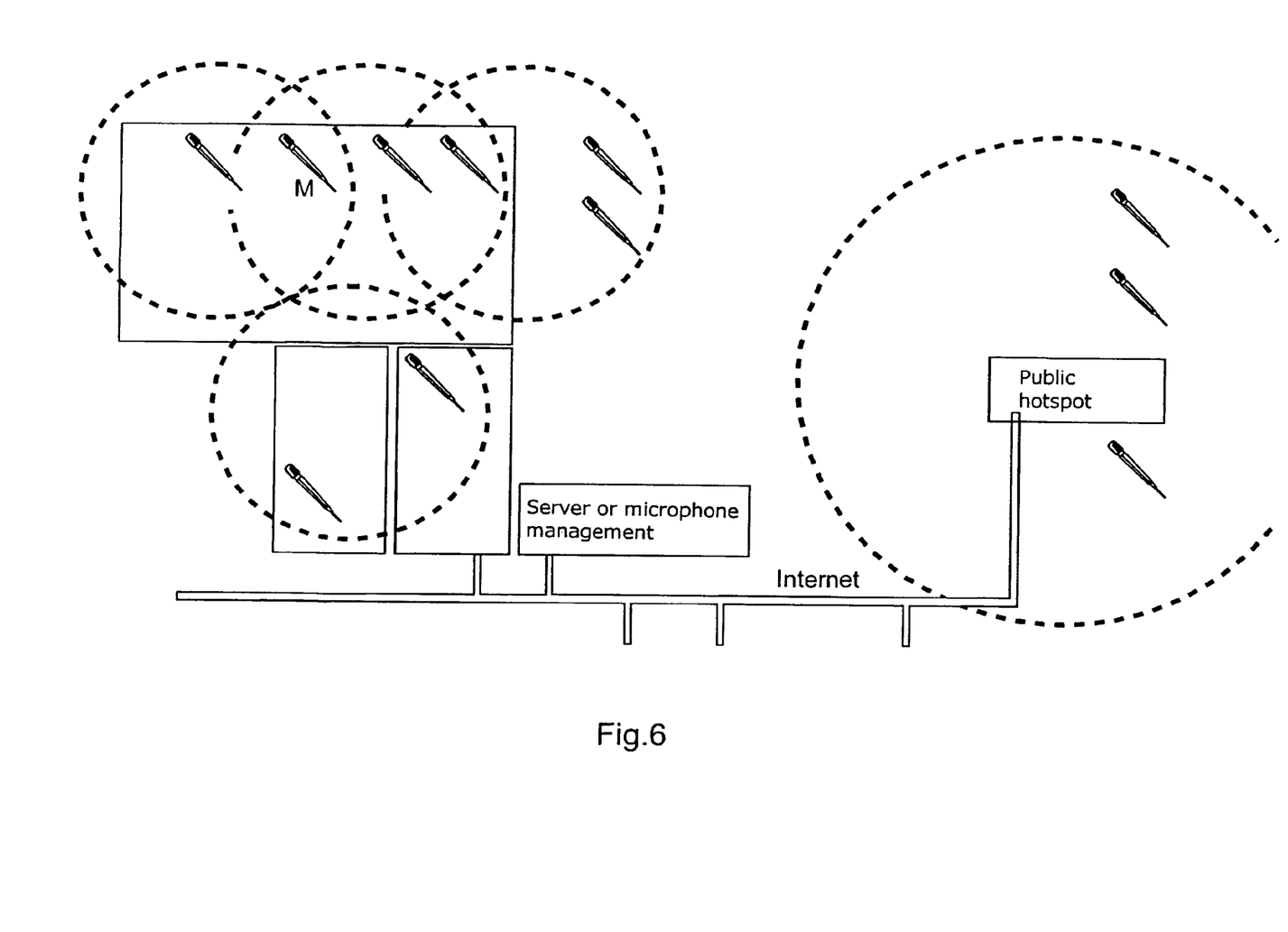
FIG. 6 shows a diagrammatic view of a multimedia network in accordance with a fourth embodiment of the invention.

FIG. 6 shows a diagrammatic representation of a multimedia network in accordance with a second embodiment. The multimedia network of the second embodiment can be additionally implemented for example in a multimedia network as shown in FIG. 4. For that purpose wireless microphones M are connected to a suitable WLAN interface and a respective IP address is associated with each of them. If the microphones M are in the corresponding transmission ranges of the various WLAN access points, they can communicate recorded audio signals wirelessly to a given network element either over the Intranet or over the Internet. A network element of that kind can then suitably store the communicated audio signals. As each microphone has its own IP address and its own WLAN interface, the respective microphones can be addressed and actuated for example by way of the Internet. Audio signals recorded by the microphones can be accordingly communicated to various IP addresses on the Internet. The left-hand side in FIG. 6 shows various private WLAN zones while the right shows what is referred to as a public hotspot, that is to say a public WLAN network. Those two networks are connected together for example by way of the Internet.

Figure 7:
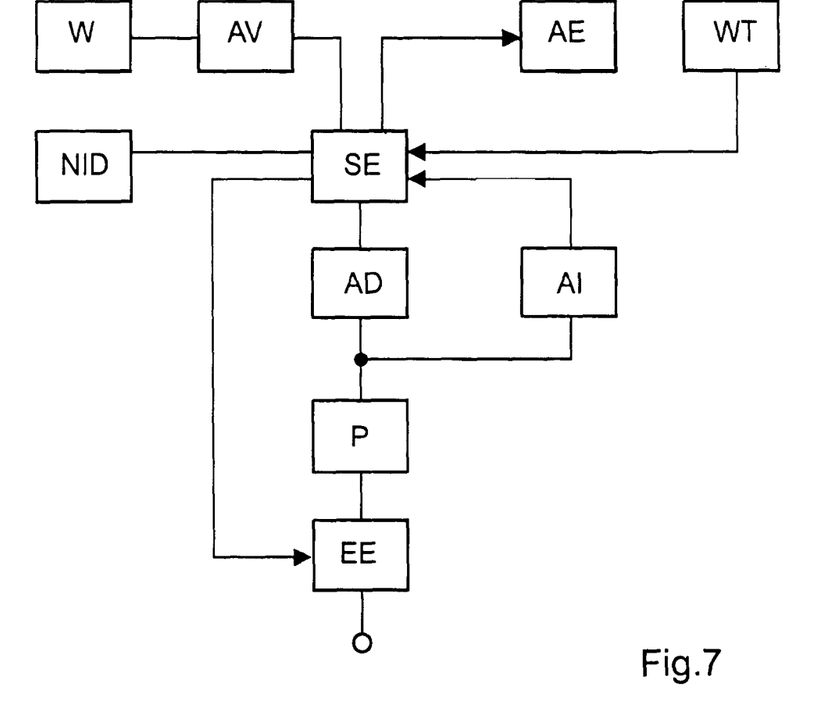
FIG. 7 shows a block circuit diagram of a wireless headphone unit in accordance with the third embodiment of FIG. 5.

FIG. 7 shows a diagrammatic view of a block circuit diagram of a wireless headphone unit of FIG. 5. The headphone unit has a transmitting/receiving unit EE for wirelessly transmitting and receiving, a buffer P for intermediate storage of the received signals, an audio decoding unit AD, a central control unit SE, a network identification unit NID, an audio amplifier AV and at least one electroacoustic transducer W. In addition thereto the headphone unit can have an Aux information unit A1, a display unit AE and selection keys WT. In that arrangement the transmitting and receiving unit EE represents for example a WLAN interface in accordance with IEEE 802.11x. Thus, by means of that WLAN interface the headphone unit can wirelessly communicate with the network. A buffer P for intermediate storage of the signals received by the transmitting/receiving unit EE is connected to the transmitting/receiving unit EE. The audio decoding unit AD decodes the signals buffered by the buffer P and forwards the decoded signals to the central control unit SE. The Aux information unit A1 serves to decode the received or buffered signals to provide possible auxiliary information or in respect of additional items of information. The decoded additional information is also forwarded to the control unit SE.

When the wireless headphone unit is switched on and logs on to the wireless network an IP address is allocated thereto by a network server. The IP address received by the transmitting/receiving unit EE is forwarded by way of the Aux information unit A1 to the control unit SE and finally stored in the network identification unit NID. The audio amplifier unit AV and the electroacoustic transducer are also connected to the central control unit. The signals received by the transmitting/receiving unit EE are decoded by the audio decoding unit AD and outputted by way of the control unit to the audio amplifier unit AV and to the transducer W.

The control unit SE is also connected to a display unit AE and forwards auxiliary information or further information relating to the transmitted audio data to the display unit AE so that they can be displayed there. That can represent for example the title and the artist of a piece of music which is being played at the time.

In addition selection keys WT are preferably externally provided on the housing of the headphone unit. The selection keys can represent for example a volume controller. Alternatively or additionally keys can also be provided, with which the user of a headphone unit can for example access a network server in the WLAN network and call up data. Thus for example music titles stored on a server can be selected in order thereafter to load them into the wireless headphone unit and to play them back. A reproduction list for example can also be assembled by means of the selection keys WT. As an alternative thereto the reproduction list can also be assembled at the network server or at another network element such as for example a network-capable computer, and transmitted to the headphone unit.

The fact that the headphone unit shown in FIG. 7 has a unique IP address means that a direct communication can be made therewith in a WLAN network. In addition the headphone unit can be addressed by any computer with its own IP address if both are connected to the Internet.

Figure 8:
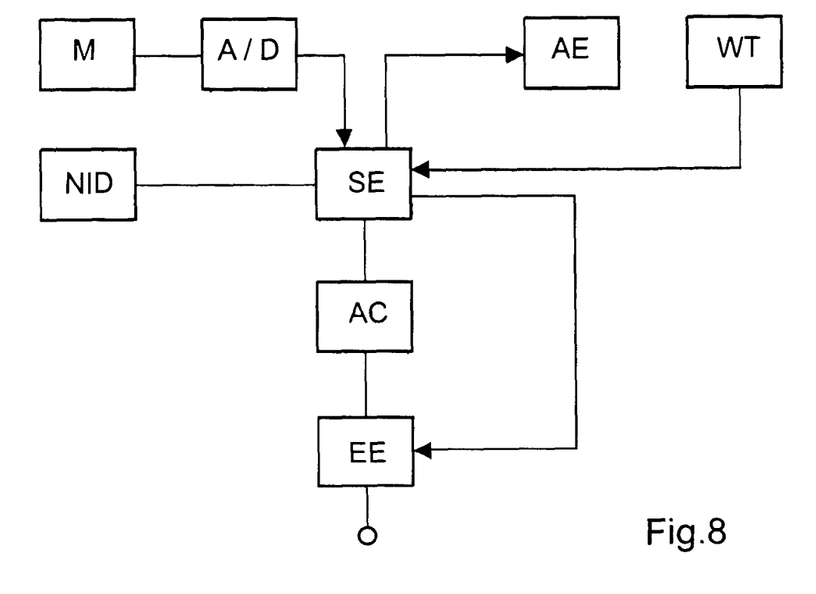
FIG. 8 shows a block circuit diagram of a wireless microphone in accordance with the fourth embodiment of FIG. 6.

FIG. 8 shows a block circuit diagram of a wireless microphone as shown in FIG. 6. The microphone M, like the headphone unit of FIG. 7, also has a transmitting/receiving unit EE, a central control unit SE and a network identification unit NID. In addition the microphone, also like the headphone unit, can have a display unit AE and selection keys WT. An electroacoustic transducer M for recording audio signals is connected to the control unit by way of an A/D converter unit. Accordingly the audio signals recorded by the electroacoustic transducer M are passed in digitized form to the control unit where they are subjected to audio coding AC in order then finally to be sent by the transmitting/receiving unit EE. The network identification of the headphone unit stored in the network identification unit NID, that is to say its IP address, is added to those coded audio signals. Accordingly the recorded audio data can be communicated to any desired network element with its own IP address if both are connected to the Internet. If a plurality of wireless microphones are present within a WLAN network the respective recorded audio signals can be managed within the network by means of suitable software.

The wireless microphone with a suitably allocated IP address and a WLAN interface can in that case also be addressed by other network elements with an IP address for example over the Internet so that the microphones are activated and the correspondingly recorded audio signals are transmitted to the activating network element.

Figure 9:
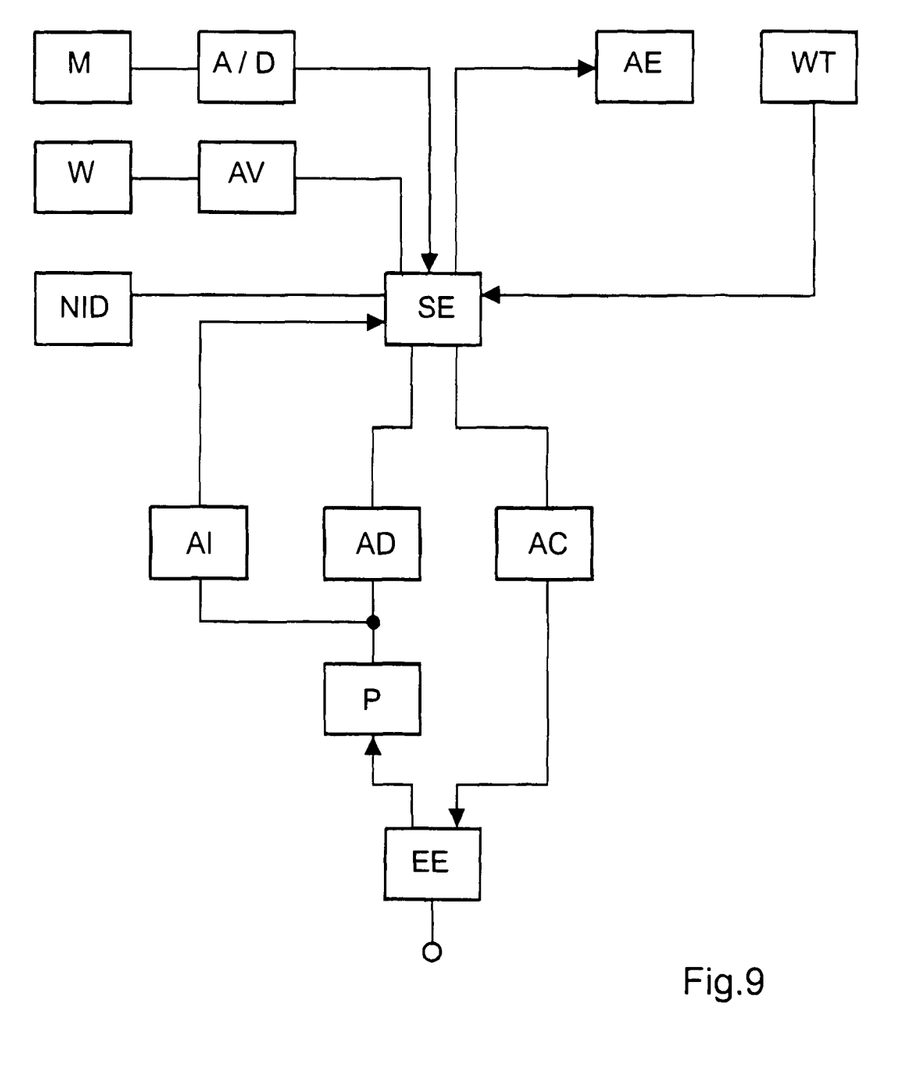
FIG. 9 shows a block circuit diagram of a headset in accordance with a fifth embodiment.

FIG. 9 shows a block circuit diagram of a headset HSG. This block circuit diagram essentially represents a combination of the block circuit diagrams of FIGS. 7 and 8. Bidirectional communication can be achieved with a headset of that kind. In that case both audio signals can be recorded and also transmitted audio signals can be reproduced.

The buffer P which is shown in FIGS. 7 and 9 and which serves for buffering of the received signals can also be used for intermediate storage for example of a plurality of pieces of music received from a network server so that a user, by means of the selection keys, can make a selection from the pieces of music which have been put into intermediate storage.

Control commands can be recognized by way of the microphone of the headset and implemented in the reproduction device. In that respect control can involve setting of the reproduction device or connection of the system to the environment.

The headset can have a further microphone for implementation of active noise sound compensation.

In addition to the above-described system the transmitting/receiving unit can also have a Bluetooth interface so that the data received from the WLAN interface can be further transmitted to other devices by way of the Bluetooth interface. Thus for example a WLAN headphone unit can forward the audio signals to be reproduced, by way of its Bluetooth interface, to a further Bluetooth headset or headphone unit so that for example two people can listen to the same piece of music.

While the foregoing description and drawings represent the present invention, it will be obvious to those skilled in the art that various changes may be made therein without departing from the true spirit and scope of the present invention.

What is claimed is:

1. A method of transmitting first data comprising audio signals based on an Internet protocol from a server with a first Internet protocol address to a mobile reproduction unit with a second Internet protocol address, said mobile reproduction unit being a wireless headphone unit having at least one electroacoustic transducer, a transmitting/receiving unit, and a network identification unit in which the second Internet protocol address is stored, said first data comprising audio signals a user of said wireless headphone unit has a right of utilization for, and said server being a public server connected to the Internet, the method comprising:
   establishing a connection between the wireless headphone unit and the server based on the first and second Internet protocol addresses;
   wirelessly transmitting the second Internet protocol address of the wireless headphone unit to the server;
   preventing communication of the first data if an Internet protocol address of a data receiver is not in conformity with said second Internet protocol address;
   transmitting the first data comprising the audio signals from the server to the wireless headphone unit; and
   reproducing received audio signals by the at least one electroacoustic transducer.

2. The method as set forth in claim 1, further comprising:
   providing a connection between the wireless headphone unit and the server having the first Internet protocol address when the wireless headphone unit is in a transmission range of a WLAN access point.

3. The method as set forth in claim 1;
   wherein the server with the first Internet protocol address represents a server on which data of a user of the wireless headphone unit are stored.

* * * * *